United States Patent
Shaffer et al.

(10) Patent No.: US 6,801,521 B1
(45) Date of Patent: Oct. 5, 2004

(54) SYSTEM AND METHOD FOR DISTRIBUTED CALL SIGNALING IN TELEPHONY-OVER-LAN NETWORKS

(75) Inventors: Shmuel Shaffer, Palo Alto, CA (US); William J. Beyda, Cupertino, CA (US); Mark Skrzynski, Capitola, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/246,404

(22) Filed: Feb. 8, 1999

(51) Int. Cl.[7] .......................... H04L 12/66; H04L 12/28; H04M 1/64; H04M 1/00

(52) U.S. Cl. .................. 370/352; 370/401; 379/100.14; 379/93.01; 379/70

(58) Field of Search ................................. 370/400–401, 370/352–356, 360; 379/220, 93.02, 93.01, 219–221, 88.17, 215, 93.35, 210.02, 210.03, 213.01, 212, 142.15, 93.23, 114.2, 114.17, 100.14; 329/70

(56) References Cited

U.S. PATENT DOCUMENTS

| | | | | |
|---|---|---|---|---|
| 5,481,594 A | * | 1/1996 | Shen et al. | 379/67 |
| 5,943,414 A | * | 8/1999 | McIntee et al. | 379/220 |
| 6,006,253 A | * | 12/1999 | Kumar et al. | 709/204 |
| 6,031,899 A | * | 2/2000 | Wu | 379/142 |
| 6,145,083 A | * | 11/2000 | Shaffer et al. | 713/201 |
| 6,167,043 A | * | 12/2000 | Frantz | 370/356 |
| 6,169,796 B1 | * | 1/2001 | Bauer et al. | 379/215 |
| 6,175,562 B1 | * | 1/2001 | Cave | 370/352 |
| 6,198,738 B1 | * | 3/2001 | Chang et al. | 370/352 |
| 6,219,413 B1 | * | 4/2001 | Burg | 379/215 |
| 6,222,838 B1 | * | 4/2001 | Sparks et al. | 370/352 |
| 6,233,234 B1 | * | 5/2001 | Curry et al. | 370/356 |
| 6,256,612 B1 | * | 7/2001 | Vo et al. | 704/500 |
| 6,314,284 B1 | * | 11/2001 | Patel et al. | 455/417 |
| 6,404,764 B1 | * | 6/2002 | Jones et al. | 370/352 |
| 6,418,210 B1 | * | 7/2002 | Sayko | 379/142.15 |
| 6,480,588 B1 | * | 11/2002 | Donovan | 379/114.2 |
| 6,549,942 B1 | * | 4/2003 | Janky et al. | 709/219 |

FOREIGN PATENT DOCUMENTS

| WO | WO 95/01070 | 1/1995 |
|---|---|---|

* cited by examiner

*Primary Examiner*—Hanh Nguyen

(57) ABSTRACT

A gateway (106) to an H.323 network configured to monitor and intercept in-band signaling from external networks. The gateway (106) further provides to the H.323 terminal (102) out-of-band signaling indicative of the nature of the in-band signaling received from the external network. If the signaling changes, the gateway (106) provides this information to the H.323 terminal (102). The gateway (106) thus prevents the need to cut through audio channels for ringback tones or busy signals.

20 Claims, 6 Drawing Sheets

SYSTEM AND METHOD FOR DISTRIBUTED CALL SIGNALING IN TELEPHONY-OVER-LAN NETWORKS

BACKGROUND OF THE INVENTION

1. Field of the Invention

The present invention relates to telecommunications systems, and in particular, to an improved telephony-over-LAN (local area network) (ToL) system.

2. Description of the Related Art

The use of local area networks (LANs) in association with telephony applications is increasingly widespread. As telephony applications on the LAN increase, however, lack of available audio bandwidth becomes a larger problem. Bandwidth may be particularly disadvantageously assigned when a ToL (telephony-over-LAN) user places a call to a destination not served by the local ToL system. In such cases, a "cut through" of an audio channel is required for call set-up signals. More particularly, busy signals and ringback signals are transmitted over the in-band audio channel, which can be an inefficient use of network resources. While the international SS7 standard provides for out-of-band control signaling, many networks to which the ToL system may be interconnected are not SS7-based.

As such, there is a need for an improved ToL system which provides for more efficient transmission of call set-up signals.

SUMMARY OF THE INVENTION

These and other drawbacks in the prior art are overcome in large part by a signaling system and methods according to the present invention.

According to one aspect of the invention, a gateway to an H.323 network is configured to monitor and intercept in-band signaling from external networks. The gateway further provides to the H.323 terminal out-of-band signaling to the H.323 terminal indicative of the nature of the in-band signaling received from the external network. If the signaling changes, the gateway provides this information to the H.323 terminal. The gateway thus prevents the need to cut through audio channels for ringback tones or busy signals.

According to another aspect of the invention, an H.323 terminal is provided which is configured to receive from a gateway out-of-band signaling information from a gateway indicative of call progress signals. The H.323 terminal itself then generates the appropriate call progress tone. In the event that an unknown call progress tone is detected, the H.323 terminal "learns" the new tone and causes the gateway to intercept the new tone after the learning has occurred.

Broadly speaking, the present invention relates to a telecommunication system in which particular devices are configured to block call signal tones and/or generate the call signal tones locally. According to one embodiment, a gateway is provided to block the call progress tones from being transmitted over a network. One or more telephony devices generates the audio files locally, and is configured to provide an identification of such known tones to the gateway. In turn, the gateway is configured to provide an indication to the devices of a change in status of the call progress tones. In response, the device ceases to play the tone locally.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
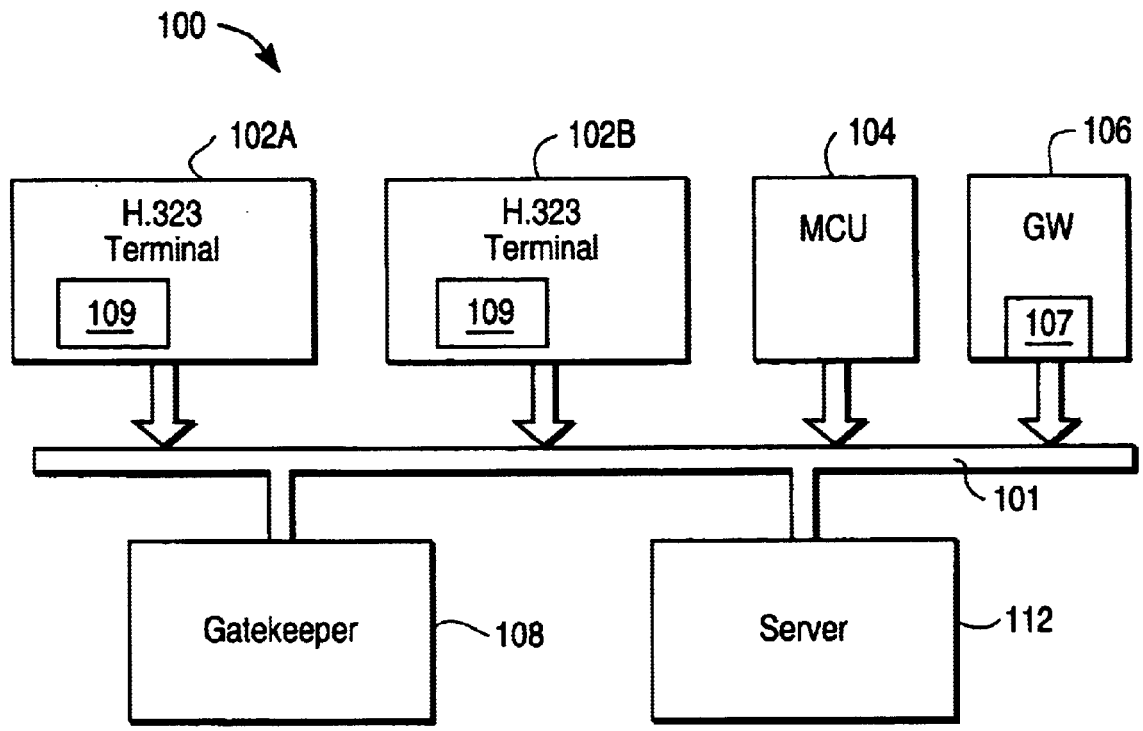
FIG. 1 is a diagram illustrating a telecommunications system according to an embodiment of the invention.

Turning now to the drawings, and with particular attention to FIG. 1, a diagram illustrating a telecommunications system 100 according to an embodiment of the present invention is shown. As will be discussed in greater detail below, the telecommunications system 100 according to the present invention allows particular devices to generate call progress tones or signals locally, so that system bandwidth is not overburdened.

In particular, the telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). As is known, the H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing.

The H.323 terminals 102a, 102b are in compliance with the H.323 standard. Thus, the H.323 terminals 102a, 102b support H.245 for negotiation of channel usage, Q.931/H.225 for call signaling and call setup, registration admission status (RAS), and RTP/RTCP for sequencing audio and video packets. The H.323 terminals 102a, 102b may further implement audio and video codecs, T.120 data conferencing protocols and MCU capabilities. In addition, each H.323 terminal 120a, 102b includes a signal generation unit 109 according to the present invention, which recognizes and simulates call progress tones. Further details concerning the Recommendation H.323 may be obtained from the International Telecommunications Union (ITU); the Recommendation is hereby incorporated by reference in its entirety as if fully set forth herein.

Figure 2:
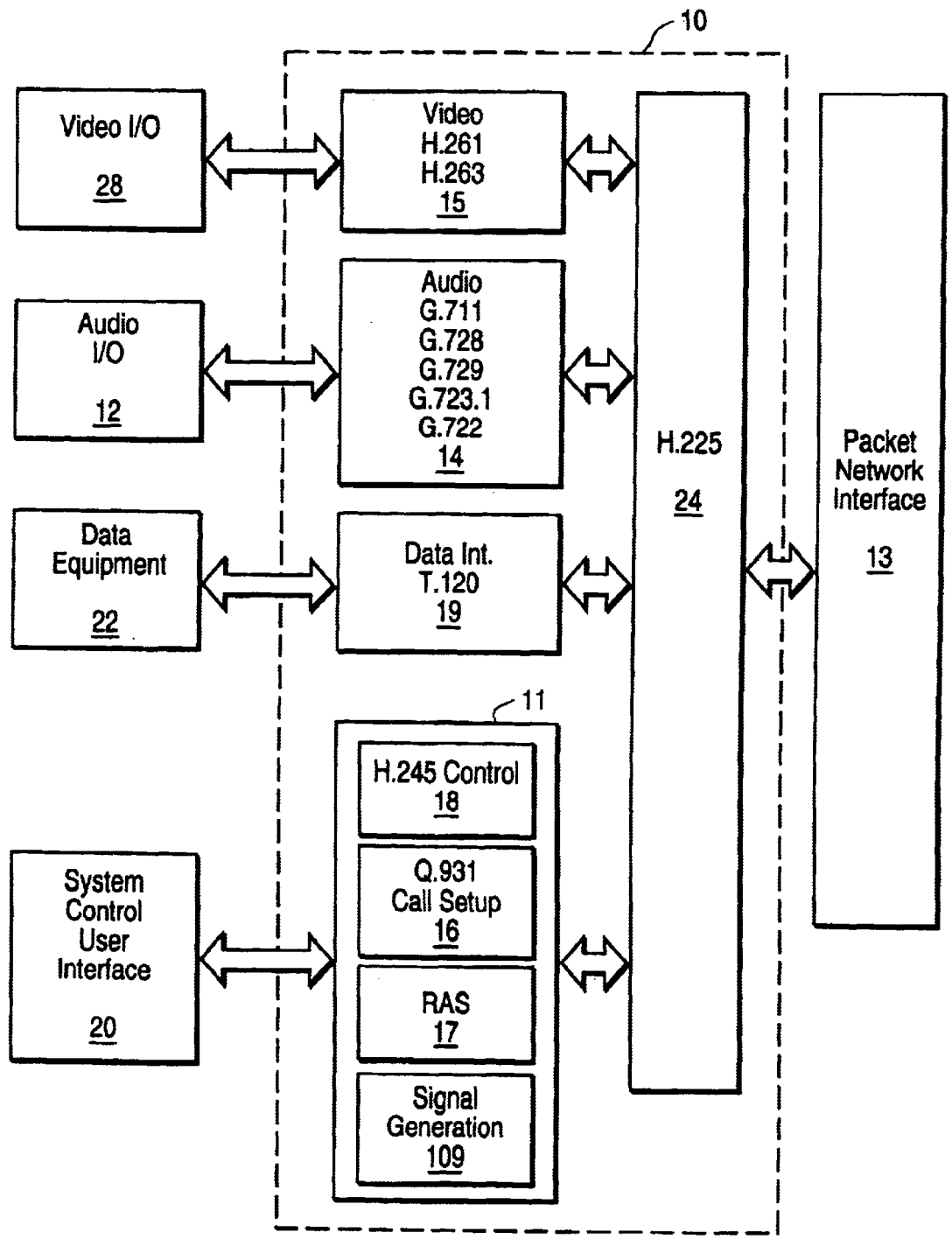
FIG. 2 is a diagram of an exemplary H.323 interface according to an embodiment of the invention.

In accordance with a specific embodiment, FIG. 2 illustrates a logical diagram of an H.323 interface to LAN 101. The interface includes a known network terminal/device 10 utilizing the ITU-T H.323 standard protocol, and a packet network interface 13 that is coupled to network terminal 10. Network interface 13 couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The network terminal 10 is coupled to a video input/output (I/O) interface 28, an audio I/O interface 12, an user application interface 19, and a system control user interface (SCUI) 20. Network terminal 10 also includes an H.225 layer 24, a video coder/decoder (codec) 15, an audio codec 14, and a control layer 11 that includes H.245 protocol functionality 18, Q.931 protocol functionality 16, and RAS protocol functionality 17.

As seen in FIG. 2, video I/O interface 28 which may be part of the standard H.323 device, connects to the video coder/decoder (codec) 15 such as an H.261 codec for encoding and decoding video signals. Coupled between video I/O interface 28 and H.225 layer 24, video codec 15 translates encoded video signals to H.225 protocol signals. Although the H.261 codec can be the video codec used for an H.323 terminal, other video codecs, such as H.263 codecs and others, may also be used for encoding and decoding video.

Audio I/O interface 12, which may be part of a standard H.323 terminal, connects to the audio codec 14, such as a G.711 codec, for encoding and decoding audio signals. Coupled to audio I/O interface 12, audio codec 14 is coupled to H.225 layer 24 via receive path delay logic 30 and translates audio signals to H.225 protocol signals. Although the G.711 codec is the mandatory audio codec for an H.323 terminal, other audio codecs, such as G.728, G.729, G.723.1, G.722, MPEG1, etc. may also be used for encoding and decoding speech. G.723.1 is a preferred codec because of its reasonably low bit rate, which enables preservation of link bandwidth, particularly in slower speed network connections. As is known, when communicating, H.323 terminals use a common coding algorithm or codec (audio and video) supported by all entities to the conversation/conference. This information is exchanged during an H.245 capability exchange phase. Generally, the receiving terminal specifies its capabilities to the sending terminal.

SCUI 20 provides signaling and flow control for proper operation of the H.323 terminal. In particular, all non-audio and non-video control signaling is handled by SCUI 20. Coupled to SCUI 20 is control layer 11 that includes H.245 layer 18, Q.931 layer 16 and RAS layer 17, which each couple to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. In addition, according to the present invention, the H.323 terminal's control layer 11 may include a signal generation unit 109 as described below. The signal generation unit 109 is configured to recognize, store and generate call progress tones.

The H.225 standard layer 24, which is derived from the Q.931 standard, is the protocol for establishing connection between two or more H.323 terminals and also formats the transmitted video, audio, data and control streams into messages for output to the network interface 13 (e.g., transport over IP network 101). The H.225 layer 24 also retrieves the received video, audio, data and control streams from messages that have been input from network interface 13. User application interface 19, which may be a T.120 protocol interface as well as other types of protocol interfaces, also couples to H.225 layer 24 and to a user device 22 such as data equipment.

Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone. As will be explained in greater detail below, the SCUI 20 is configured, upon initialization, to identify one or more queues as callable entities (i.e., as entities capable of receiving calls from the particular device).

The H.323 gateway 106 (FIGS. 2 and 4) generally provides a translation function between H.323 conferencing endpoints and other terminal types and performs call setup and clearing on both the LAN side and switched circuit network side (e.g. public switched telephone network or PSTN). The H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing. In accordance with the present invention, the H.323 gateway 106 includes an in-band signaling monitor 107 to monitor and intercept in-band signaling, as will be discussed in greater detail below. The in-band signaling monitor 107 further provides control signals to the H.323 terminals 102a, 102b indicative of which in-band signals are being received.

Figure 3:
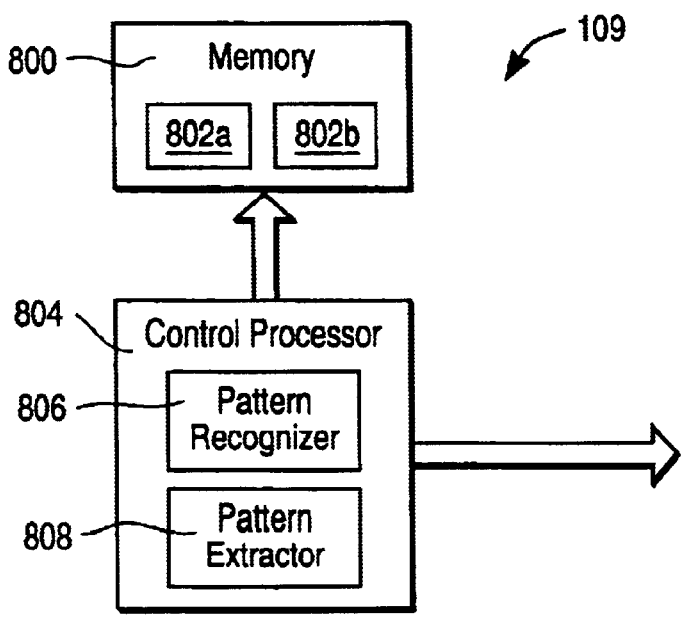
FIG. 3 is a diagram illustrating an exemplary bandwidth allocation server according to an embodiment of the invention.

In particular, turning now to FIG. 3, a block diagram of an exemplary signal generation unit 109 is illustrated. It is noted that, while shown as discrete components, typically the functionality of the signal generation unit 109 is implemented in software. Thus, FIG. 3 is exemplary only. The signal generation unit 109 includes a control processor 804 coupled to a memory 800. The control processor 804 may be the H.323 terminal's central processing unit, such as a Pentium or Pentium II or compatible processor, or a digital signal processor associated with the terminal's sound card. Similarly, the memory 800 may be the terminal's storage or a sound card storage unit. The memory 800 stores audio files 802a, 802b of the call progress tones to be played back locally. The audio files 802a, 802b may be in any known format, such as MIDI or .wav format.

As will be discussed in greater detail below, the control processor 804 may include known pattern recognition functionality 806 and pattern extraction functionality 808. More particularly, the control processor 804 may be configured to recognize known audio formats, and access and play back the corresponding audio files in memory for them. Additionally, the control processor is configured to extract audio patterns from an incoming data stream, and store them as audio files in the memory 800.

Figure 4:
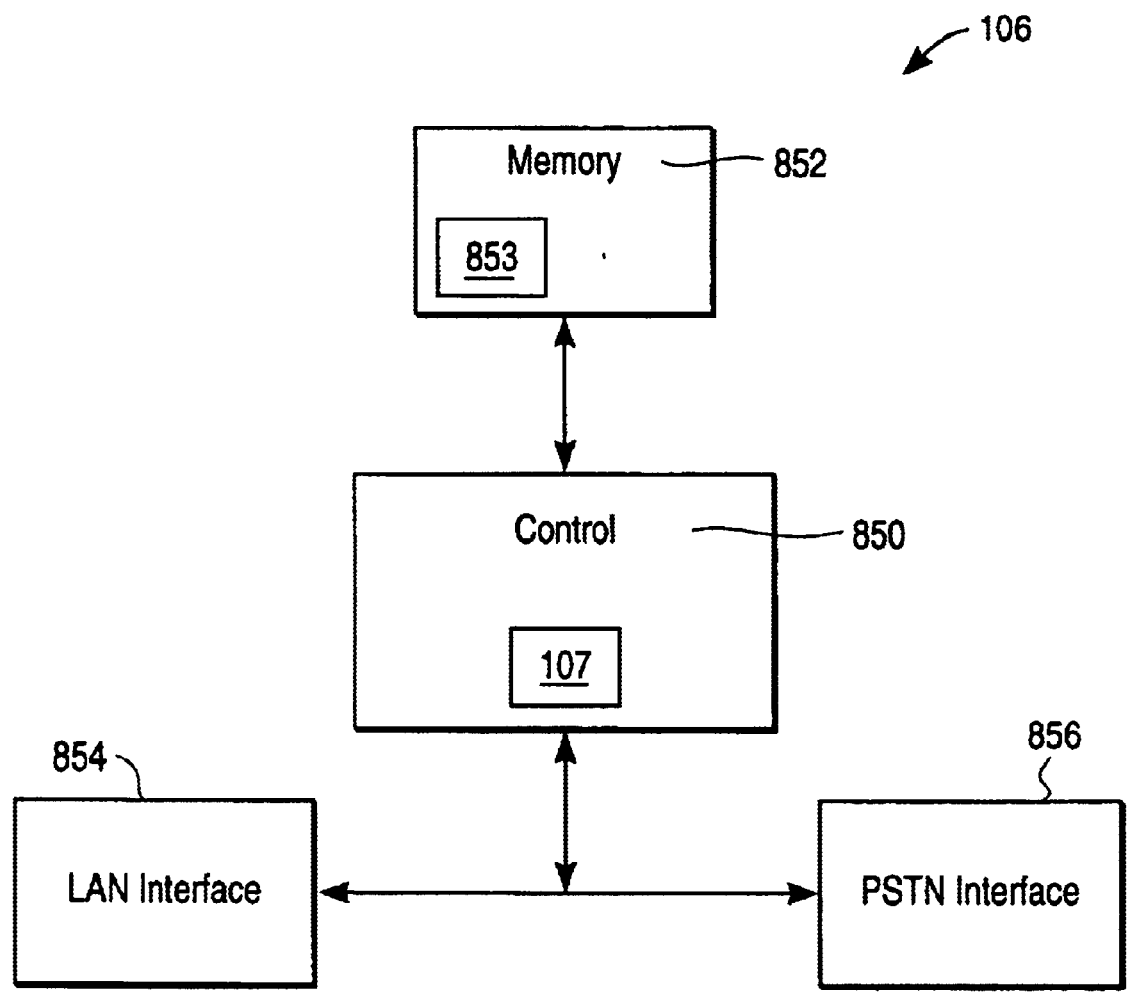
FIG. 4 is a flowchart illustrating operation of an embodiment of the invention.

As shown in FIG. 4 in accordance with a specific embodiment, the H.323 gateway 106 includes a controller 850, a memory 852, and a known PSTN interface 856 and a ToL interface 854. In addition, the gateway 106 includes an in-band signaling monitor 107, which may be embodied as software in the controller 850. The in-band signaling monitor 107 may be configured to recognize and intercept in-band call progress audio signals which otherwise would occupy LAN bandwidth.

According to a first embodiment of the invention, the gateway 106, in particular, the in-band signaling monitor 107, is configured to initially allow call progress signals to pass to the H.323 terminal 102. When the H.323 terminal 102 recognizes the call progress signal, it issues a command to the gateway 106 to block the signal. The H.323 terminal 102 then locally plays an audio file corresponding to the call progress signal.

According to a second embodiment of the invention, the gateway 106 itself stores in the memory 852 a table 853 identifying which H.323 terminals are provided with local audio files of particular call progress tones. The gateway 106 also stores a database 853 of audio files. When the gateway 106 receives such signals, it accesses its database(s) 853, blocks the signals, and transmits an out-of-band command to the H.323 terminal 102 to access the particular (local) file. If the H.323 terminal does not have such a file, the gateway 106 may transmit such a file to the H.323 terminal. Alternatively, the gateway 106 may let the signal through to the H.323 terminal for the H.323 terminal to learn the signal and store a corresponding audio file. Further, if none of the H.323 terminals "knows" the signal, and the gateway 106 itself does not have stored a corresponding audio file, then the gateway 106 may itself learn the call progress signal and store it as an audio file for later transmission to the H.323 terminals.

Figure 5A:
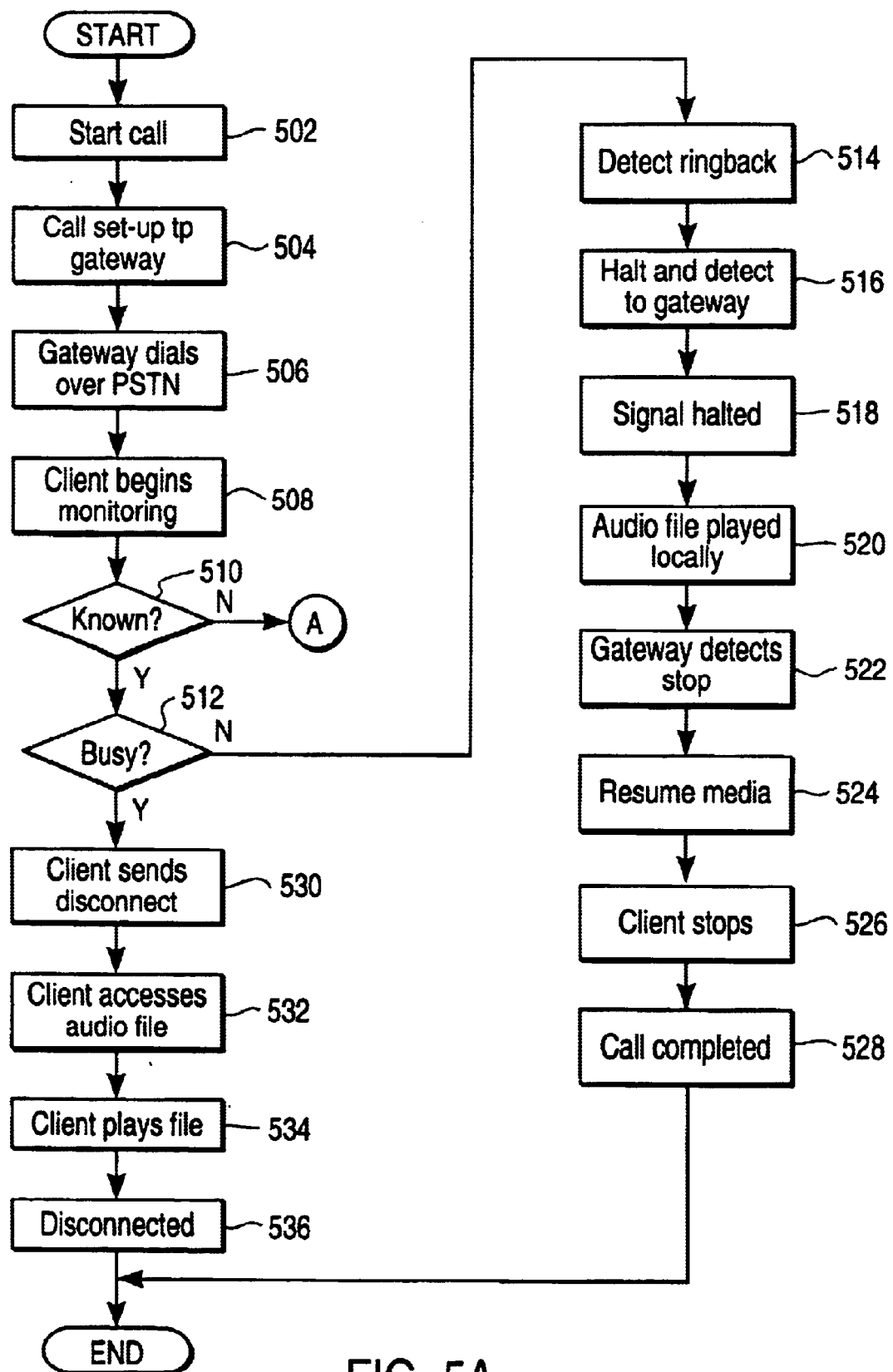
FIGS. 5A and 5B is a flowchart illustrating operation of an embodiment of the invention.
Figure 5B:
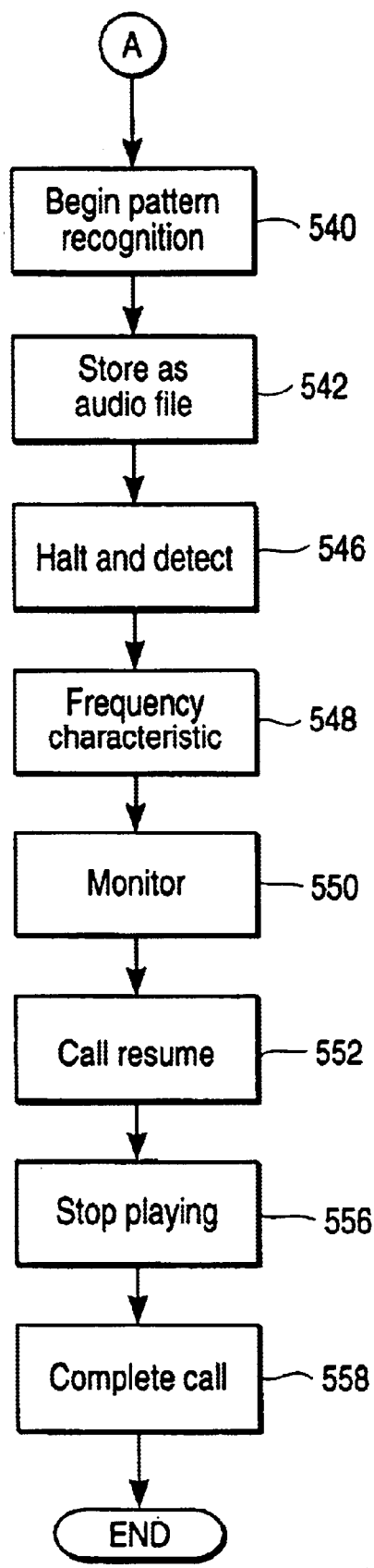

Turning now to FIG. 5A and FIG. 5B, a flowchart illustrating operation of a first embodiment of the invention is illustrated. In a step 502, a user initiates a call from an H.323 terminal (102a or 102b) within the packet switched network to a party outside the network. In a step 504, the call set-up request is provided to the H.323 gateway 106. It is noted that, typically, is the gatekeeper 108 would be handling call set-up from the H.323 terminal 102 to the gateway 106, but discussion of the gatekeeper involvement is omitted since gatekeeper involvement is not necessarily required. The gateway 106, in a step 506, receives the call setup information and, in a known manner, dials the called party over the public switched telephone network (PSTN). In a step 508, the H.323 terminal 102 which began the call begins monitoring for call progress signals, such as busy signals or ringback signals, which are provided from the gateway 106. In a step 510, the H.323 terminal compares the incoming call progress signals to its stored database of signals. More particularly, the control processor 804's pattern recognizer 806 receives the call progress signals and accesses the memory 800 for a corresponding match. If the call progress signals are recognized, then in a step 512, the H.323 terminal 102 determines whether the received signal is a busy signal. If the signal is a busy signal, then in a step 530, the H.323 terminal 102 sends a known disconnect message to the gateway 106. The H.323 terminal 102 (i.e., the control processor 804) also accesses its audio files 802 from the memory 800 in a step 532. The corresponding audio file 802 is then locally played back via the H.323 terminal 102's audio I/O in a step 534. Finally, in a step 536, the call is disconnected by the gateway 106 and the playing of the audio file 802 is halted.

If, in step 512, the detected call progress signal was not a busy signal, then in step 514, the H.323 terminal 102 may recognize the tone as a ringback signal. Again, the control processor 804's pattern recognizer functionality 806 identifies a pattern which is compared with its stored database of call signals in the memory 800. In a step 516, upon recognizing the ringback signal, the H.323 terminal 102 sends a Halt and Detect message according to the present invention to the gateway 106. The Halt and Detect command may be an H.245-type command. In a step 518, the gateway 106 receives the Halt and Detect command and, in response, the in-band signal monitor 107 intercepts the incoming ringback tone.

In a step 520, the H.323 terminal 106's control processor 804 accesses the memory 800 for the corresponding audio file 802 and plays it back locally. The gateway 106's in-band signal monitor 107 continues to monitor the PSTN for the ringback signal and detects any changes, for example, the ringback stopping (and hence, that the call has been connected), in a step 522. Once the in-band signal monitor 107 detects that the ringback signal has halted, the gateway 106's controller 850 sends a signal to the H.323 terminal 102a indicating that the gateway 106 will resume sending the media stream, in a step 524. Upon reception of the signal, the H.323 terminal 102's control processor 804 halts the playback of the audio file 802 containing the ringback signal, in a step 526. Next, in a step 528, the call is completed in the standard manner.

Back in step 510, if the H.323 terminal 102 did not recognize the incoming call signal (i.e., the pattern recognizer 806's compare failed), then as shown in FIG. 5B in a step 540, the H.323 terminal 102 enters a pattern recognition and extraction mode. More particularly, the pattern recognizer 806 of the control processor 804 begins listening for repeated tones, which are then extracted by the pattern extractor 808. The extracted pattern or tone may then be associated with the corresponding called number and is stored as an audio file 802 in the memory 800 in a step 542.

Once the pattern has been detected, extracted and stored, the H.323 terminal 102 plays back the audio file 802 and sends a Halt and Detect command to the gateway 106 in a step 546. In addition, the H.323 terminal 102 may send in step 548 details concerning the incoming call signal, such as frequency characteristics, and the like, so that the gateway 106 is able to recognize it. Alternatively, the gateway 106 may also itself extract the signal and store it for future use, in a manner similar to that described for the H.323 terminal 102.

Next, in a manner similar to that described above, the gateway 106 continues to monitor the incoming call signal tone for changes in a step 550. The gateway 106's in-band signal monitor 107 detects a change and provides an appropriate signal to the H.323 terminal 102 to indicate that the media stream is to resume in a step 552. Next, in a step 556, the H.323 terminal 102 recognizes the signal received from the gateway 106 and terminates the playing of the audio file. Finally, the call is completed in the standard fashion, in a step 558.

Figure 6:
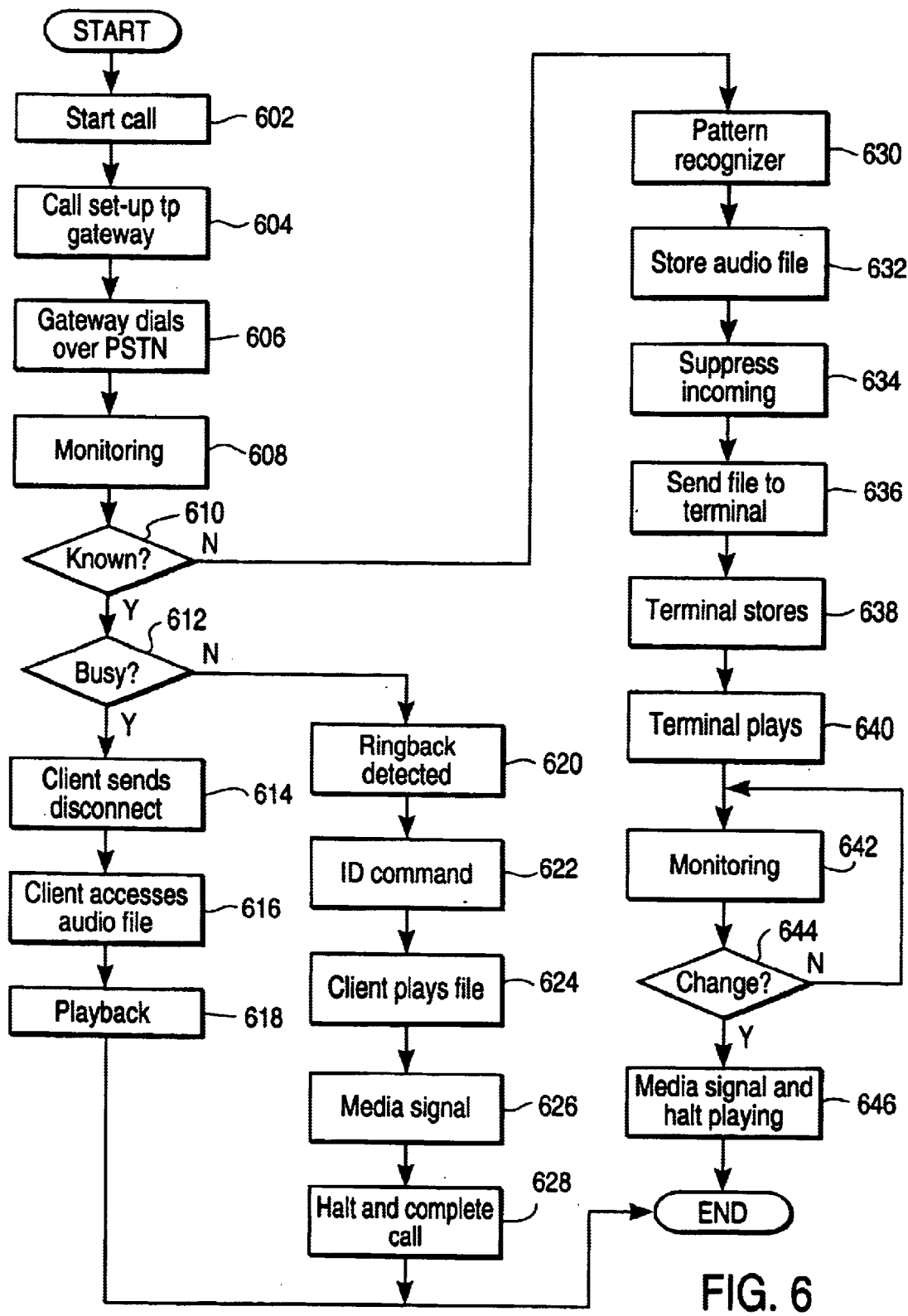
FIG. 6 is a flowchart illustrating operation of an embodiment of the invention.

In the embodiment illustrated in FIG. 6, the gateway 106 recognizes the incoming call progress signal, intercepts it, determines if the H.323 terminal has a corresponding audio file, and provides a signaling message to the H.323 client terminal 102a. More particularly, in a step 602, the user of the H.323 terminal 102a starts a call, for example, by dialing a phone number of a third party on an external network. A corresponding call set-up signal is placed to the gateway 106 in a step 604. As noted above, a gatekeeper may typically be interposed to handle signaling between the H.323 terminal and the gateway 106, but discussion of the gatekeeper involvement is omitted here as details on gatekeeper involvement would be known to one of ordinary skill in the art. The call set-up signal is a standard H.323 call set-up signal. In response to the call set-up signal, in a step 606, the gateway 106 dials the recipient's phone number over the public switched telephone network (PSTN).

Further, the gateway 106, in particular, the in-band signal monitor 107, monitors the PSTN for call progress signals, in a step 608, and intercepts the signals. The gateway 106's controller 850 accesses its database of signals when the call signals are received, in a step 610. If the signals are known, the gateway 106 will determine whether the H.323 terminal has stored an audio file corresponding to the signal. For example, in a step 612, the gateway 106 may determine that the signal is a busy signal, which is stored as an audio file in the H.323 terminal 102. If the signal is a busy signal, in a step 614, the gateway 106 sends a message to the H.323 terminal 102 advising the client of this busy signal and the client sends a disconnect message to gateway 106 to stop sending the busy signal and to end the call.

In a step 616, the H.323 client terminal 102 accesses the corresponding file and locally plays it back, in a step 618, via the H.323 terminal 102's sound system.

Back in step 612, if the call progress signal is determined not to be a busy signal, in a step 620, the gateway 106 may recognize the signal as a ringback signal. Again, the gateway 106's controller 850 accesses a database to determine whether a corresponding audio file exists in the particular H.323 terminal 102 making the call. The gateway 106 then sends a command to the H.323 terminal 102 identifying the call signal, in a step 622. (If the file is not present at the H.323 terminal 102, but the gateway 106 recognizes it and has such a file already stored, the gateway 106 will also send the audio file of the call signal to the H.323 terminal 102). In a step 624, the H.323 terminal accesses the appropriate file from its memory and locally plays the audio file. Next, in a step 626, the gateway 106 sends an signal to the H.323 terminal 102 indicating that the media stream is to resume. In response, the H.323 terminal 102 stops playing the audio file, in a step 628, and the call is completed in a known manner.

Back in step 610, if the call progress signal is not recognized by the gateway 106, in a step 630, the gateway 106 activates a pattern recognizer (not shown) associated with the in-band signal monitor 107 to recognize and/or extract the file from the incoming data stream. In a step 632, the extracted data stream is stored as an audio file in a known data file format. For example, the file may be stored as a .wav or MIDI file. Then, in a step 634, the gateway 106 suppresses the incoming stream (i.e., prevents it from being passed to the H.323 terminal 102). In a step 636, the audio file containing the signal is sent to the H.323 terminal 102. The H.323 terminal 102 receives the audio file and stores it, in a step 638. In a step 640, the H.323 terminal 102 locally plays the audio file via its audio I/O system.

In a step 642, the gateway 106 continues to monitor the incoming signal and block it. If a change in the signal is detected in a step 644, then in a step 646 the gateway 106 sends a signal to the H.323 terminal 102 indicating that the media stream is to resume; in response, the H.323 terminal stops playing its audio file and the call is completed.

What is claimed is:

1. A telecommunications system, comprising:

a packet switched network;

a gateway configured to interface said packet switched network to a second network, said gateway configured to block call signal tones for call signaling received from said second network from being transmitted over said packet switched network; and one or more telephony devices coupled to said packet switched network, said one or more telephony devices configured to play locally audio files corresponding to reproduced blocked call signal tones for call signaling for said call at said second network.

2. The telecommunications system in accordance with claim 1, said packet switched network being H.323 compatible.

3. The telecommunications system in accordance with claim 1, said one or more telephony devices configured to identify known call signal tones before said known call signal tones are blocked by said gateway.

4. The telecommunications system in accordance with claim 3, said one or more telephony devices configured to access memory for audio files of said call signal tones before said call signal tones are blocked by said gateway.

5. The telecommunications system according to claim 1, wherein said gateway is configured to provide a signal to said one or more telephony devices identifying a change in signaling.

6. A telecommunications system comprising:

a packet swithed network;

a gateway configured to interface said placket switched network to a second network, said gateway configured to block call signal tones, for call signaling received from said second network from being transmitted over said packet switched network; and one or more telephony devices coupled to said packet switched network, said one or more telephony devices configured to play locally audio files corresponding to reproduced blocked call signal tones for call signaling for said call at said second network;

said one or more telephony devices configured to extract unknown call signal tones and store said unknown call signal tones as audio files before said unknown call signal tones are blocked by said gateway.

7. The telecommunications system in accordance with claim 6, said one or more telephony devices configured to provide an identification of said call signal tones to said gateway.

8. A telecommunications system comprising:

a packet switched network;

a gateway configured to interface said packet switched network for a second network, said gateway configured to block call signal tones for call signaling received from said second network from being transmitted over said packet switched network; and one or more telephony devices coupled to said packs switched network, said one or more telephony devices configured to play locally audio files corresponding to reproduced blocked call signal tones for call signaling for said call at said second network;

said gateway configured to extract unknown call signal tones and store said unknown call signal tones as audio files.

9. The telecommunications system in accordance with claim 8, said gateway configured to transmit said audio files to said one or more telephony devices.

10. A method for operating a telecommunications system including a gateway coupling a packet switched network having a plurality of telephony devices to a second network, comprising:

receiving a call signal tone at one of said plurality of telephony devices;

identifying said call signal tone;

blocking said call signal tone to said second network;

accessing an audio file to play a reproduction of said call signal tone locally.

11. The method in accordance with claim 10, including said gateway transmitting a signal to said one of said plurality of telephony devices advising said one of said plurality of telephony devices that said call signal has changed.

12. The method in accordance with claim 10, including said gateway identifying said received call signal tone.

13. A method for operating a telecommunications system including a gateway coupling a packet switched network having a plurality of telephony devices to a second network, comprising:

receiving a call signal tone at one of said plurality of telephony devices;

identifying said call signal tone;

blocking said call signal tone to said second network;

accessing an audio file to play a reproduction of said call signal tone locally;

including said one of said plurality of telephony devices configured to extract as an audio file an unknown call signal tone.

14. The method in accordance with claim 13, including said one of said plurality of telephony devices transmitting a signal to said gateway identifying said call signal tone so that said gateway can block said call signal tone.

15. A telecommunications device, comprising:

a controller including a pattern recognizer for recognizing patterns in call signal tones for a from a first network; and a memory for storing as audio files patterns recognized by said controller, wherein said controller is configured to play said audio files comprising reproductions of said call signal tones at a second network when said call signal tones are blocked.

16. The telecommunications device according to claim 15, said controller configured to provide a signal to a gateway identifying known call signals which are to be blocked.

17. A gateway for a telecommunications system, comprising:

a first interface for interfacing to a first network;

a second interface for interfacing to a second network;

a controller including a call signal tone monitor for monitoring call signal tones received from said first network; and a memory configured to store audio files of call signal tones for reproducing said call signal tones at said second network.

18. The gateway according to claim 17, wherein said memory is configured to store a table indicating which of one or more telephony devices coupled to said second network is configured to play an audio file corresponding to ones stored in said gateway.

19. The gateway according to claim 17, said controller configured to block said call signal tones from being transmitted over said second network.

20. The gateway according to claim 17, said controller configured to provide a signal to one or more telephony devices on said second network indicating a change of status of a call signal tone received on said first network.

* * * * *